US012195591B2

(12) United States Patent
Jeon et al.

(10) Patent No.: US 12,195,591 B2
(45) Date of Patent: Jan. 14, 2025

(54) POLY(AMIDE-IMIDE) COPOLYMER, METHOD OF MANUFACTURING THE SAME, POLY(AMIDE-IMIDE) COPOLYMER FILM, WINDOW FOR DISPLAY DEVICE, AND DISPLAY DEVICE

(71) Applicants: SAMSUNG ELECTRONICS CO., LTD., Suwon-si (KR); SAMSUNG SDI CO., LTD., Yongin-si (KR)

(72) Inventors: Hyunjeong Jeon, Seoul (KR); Sang Soo Jee, Hwaseong-si (KR); Kyeong-Sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/222,372

(22) Filed: Jul. 14, 2023

(65) Prior Publication Data
US 2023/0357505 A1 Nov. 9, 2023

Related U.S. Application Data

(60) Division of application No. 16/919,353, filed on Jul. 2, 2020, now Pat. No. 11,739,183, which is a continuation of application No. 15/847,063, filed on Dec. 19, 2017, now Pat. No. 10,738,164.

(30) Foreign Application Priority Data

Feb. 22, 2017 (KR) .................. 10-2017-0023582

(51) Int. Cl.
*C08G 73/14* (2006.01)
*C08G 18/60* (2006.01)
*C08G 18/64* (2006.01)
*C08G 18/73* (2006.01)
*C08G 18/75* (2006.01)
*C08G 18/76* (2006.01)
*C08G 73/10* (2006.01)
*C08J 5/18* (2006.01)
*C09D 179/08* (2006.01)
*G02F 1/1333* (2006.01)

(52) U.S. Cl.
CPC .......... *C08G 73/14* (2013.01); *C08G 18/603* (2013.01); *C08G 18/6438* (2013.01); *C08G 18/73* (2013.01); *C08G 18/755* (2013.01); *C08G 18/7621* (2013.01); *C08G 73/1035* (2013.01); *C08J 5/18* (2013.01); *C09D 179/08* (2013.01); *G02F 1/133308* (2013.01); *C08G 2150/00* (2013.01); *C08J 2379/08* (2013.01); *G02F 1/133305* (2013.01); *G02F 1/133331* (2021.01)

(58) Field of Classification Search
CPC ................. C08G 18/6438; C08G 73/1035; C08G 73/14; C08G 18/755; C08G 18/7621; C08J 2379/08; C09D 179/08; C08L 79/08; G02F 1/133305; G02F 1/133308
See application file for complete search history.

(56) References Cited

U.S. PATENT DOCUMENTS

| | | | |
|---|---|---|---|
| 4,954,601 A | 9/1990 | King | |
| 6,329,041 B1 | 12/2001 | Tsuchiya | |
| 8,623,968 B2 | 1/2014 | Cho et al. | |
| 9,278,488 B2 | 3/2016 | Park et al. | |
| 9,951,250 B2 | 4/2018 | Cho et al. | |
| 2004/0105987 A1 | 6/2004 | Hongo et al. | |
| 2012/0157652 A1 | 6/2012 | Cho et al. | |
| 2013/0020117 A1* | 1/2013 | Yamato | C08J 7/046 428/318.6 |
| 2014/0008292 A1 | 1/2014 | Wang et al. | |
| 2014/0316074 A1 | 10/2014 | Park et al. | |
| 2015/0225607 A1 | 8/2015 | Cho et al. | |
| 2016/0194448 A1 | 7/2016 | Song et al. | |
| 2016/0222249 A1 | 8/2016 | Choi et al. | |
| 2016/0319076 A1 | 11/2016 | Ju et al. | |
| 2019/0077960 A1 | 3/2019 | Kim | |

FOREIGN PATENT DOCUMENTS

| | | | | |
|---|---|---|---|---|
| CN | 104311851 A | | 1/2015 | |
| GB | 1119791 | * | 7/1965 | |
| GB | 1119791 A | * | 7/1968 | ......... C08G 18/6438 |
| JP | 09328548 A | | 12/1997 | |
| JP | 2011127024 A | | 6/2011 | |
| JP | 2012184281 A | | 9/2012 | |
| JP | 2015504458 A | | 2/2015 | |
| JP | 2016125063 A | | 7/2016 | |
| KR | 1020120069382 A | | 6/2012 | |
| KR | 20150094081 A | | 8/2015 | |
| KR | 1020150089320 A | | 8/2015 | |

(Continued)

OTHER PUBLICATIONS

English translation of Office Action dated Dec. 21, 2021, issued in corresponding Japanese Patent Application No. 2018-026868.

(Continued)

*Primary Examiner* — Ana L. Woodward
(74) *Attorney, Agent, or Firm* — CANTOR COLBURN LLP

(57) ABSTRACT

A poly(amide-imide) copolymer including an amide structural unit having an amide bond in a polymer main chain and an imide structural unit having an imide bond in a polymer main chain, wherein at least one imide structural unit includes a moiety cross-linked to an adjacent polymer main chain through an amide bond.

10 Claims, 2 Drawing Sheets

(56) References Cited

FOREIGN PATENT DOCUMENTS

| KR | 1020160082639 A | 7/2016 |
|---|---|---|
| KR | 20170011011 A | 2/2017 |

OTHER PUBLICATIONS

Extended European Search Report dated Jul. 27, 2018, of the corresponding European Patent Application No. 18156679.5.
May May Teoh, et al., "Exploring Torlon/P84 co-polyamide-imide blended hollow fibers and their chemical cross-linking modifications for pervaporation dehydration of isopropanol", Seperation and Purficiation Technology 61 (2008) 404-413.
Office Action dated Dec. 21, 2021, issued in corresponding Japanese Patent Application No. 2018-026868.
English Translation of Office Action dated Mar. 29, 2024 of the corresponding Korean Patent Application No. 10-2017-0023582, 10 pp.
Office Action dated Mar. 29, 2024 of the corresponding Korean Patent Application No. 10-2017-0023582, 9 pp.
S.M. Dutczak, et al., New crosslinking method of polyamide-imide membranes for potential application in harsh polar aprotic solvents, Separation and Purification Technology 102 (2013) 142-146.

* cited by examiner

POLY(AMIDE-IMIDE) COPOLYMER, METHOD OF MANUFACTURING THE SAME, POLY(AMIDE-IMIDE) COPOLYMER FILM, WINDOW FOR DISPLAY DEVICE, AND DISPLAY DEVICE

CROSS-REFERENCE TO RELATED APPLICATION

This application is a divisional application of U.S. patent application Ser. No. 16/919,353 filed Jul. 2, 2020, now U.S. Pat. No. 11,739,183, which in turn claims priority to U.S. patent application Ser. No. 15/847,063 filed Dec. 19, 2017, now U.S. Pat. No. 10,738,164, and Korean Patent Application No. 10-2017-0023582 filed in the Korean Intellectual Property Office on Feb. 22, 2017, and all the benefits accruing therefrom under 35 U.S.C. §§ 119, 120, the contents of which are herein incorporated by reference in their entirety.

BACKGROUND

1. Field

A poly(amide-imide) copolymer, a method of manufacturing the same, a poly(amide-imide) copolymer film, a window for a display device, and a display device are disclosed.

2. Description of the Related Art

To be manufactured into a smart phone, a tablet PC, or the like, a portable electronic device must include a display device that is flexible (for example, bendable, foldable, or rollable).

Currently, the display device mounted on the portable electronic device utilizes strong glass to protect a display module.

However, the glass lacks of flexibility, and thus may not be used in a flexible display device.

Accordingly, there is a need for a transparent film made of a polymer material as an alternative to the glass.

SUMMARY

An embodiment provides a poly(amide-imide) copolymer capable of improving optical characteristics and mechanical characteristics.

Another embodiment provides a method of manufacturing the poly(amide-imide) copolymer.

Yet another embodiment provides a poly(amide-imide) copolymer film capable of improving optical characteristics and mechanical characteristics.

Still another embodiment provides a window for a display device including the poly(amide-imide) copolymer film.

Further embodiment provides a display device including the window for a display device.

Further embodiment provides a poly(amide-imide) copolymer precursor for forming the poly(amide-imide) copolymer.

According to an embodiment, a poly(amide-imide) copolymer includes:
an amide structural unit having an amide bond included in a polymer main chain, and
an imide structural unit having an imide bond included in the polymer main chain,
wherein at least one imide structural unit includes at least one moiety cross-linked to an adjacent polymer main chain through an amide bond.

The imide structural unit may include:
a first imide structural unit including a moiety cross-linked to an adjacent polymer main chain through an amide bond, and
a second imide structural unit, which is not cross-linked to an adjacent polymer main chain.

The first imide structural unit may include at least one of a structural unit represented by Chemical Formula 1 and a structural unit represented by Chemical Formula 2.

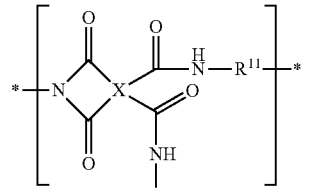

Chemical Formula 1

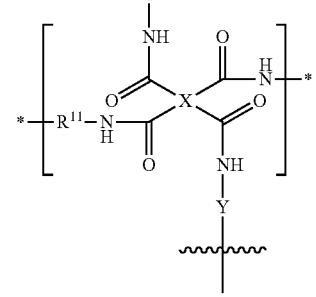

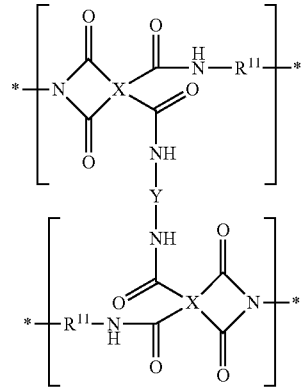

Chemical Formula 2

In Chemical Formula 1 or 2,

X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond, a substituted or unsubstituted fluorenyl group, or a linking group including O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$, or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, and is a linking point of the polymer main chain.

The structural unit represented by Chemical Formula 1 may include a structural unit represented by Chemical Formula 1a.

Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, R$^{12}$ and R$^{13}$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, Chemical Formula 1a

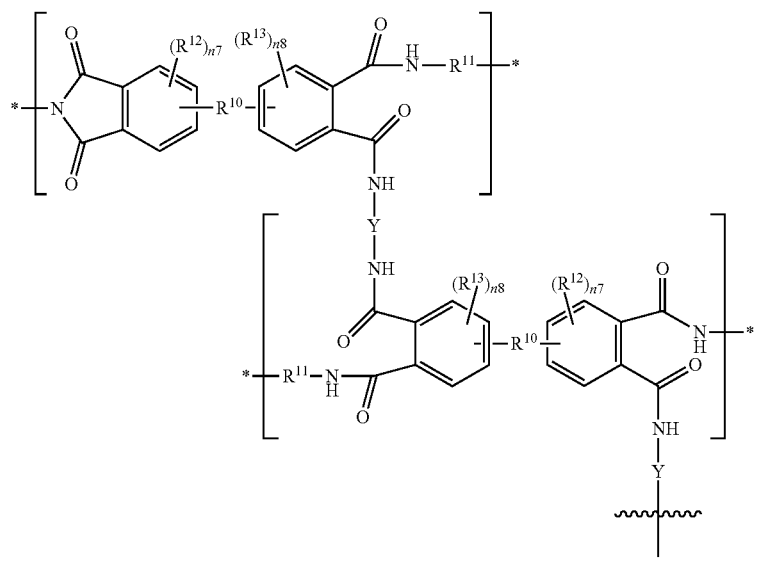

In Chemical Formula 1a,

R$^{10}$ is the same or different in each structural unit and is independently a single bond or a linking group including a fluorenylene group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, n7 and n8 are the same or different in each structural unit and are independently an integer ranging from 0 to 3, and is a linking point of the polymer main chain.

The structural unit represented by Chemical Formula 1a may include at least one of a structural unit represented by Chemical Formula 1aa and a structural unit represented by Chemical Formula 1ab.

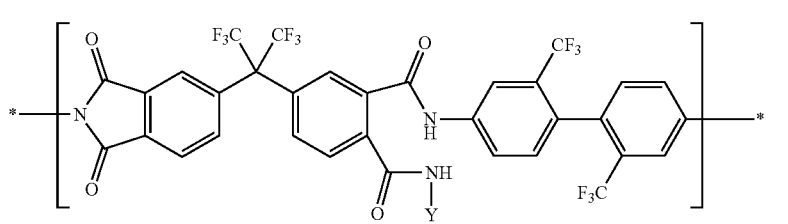

Chemical Formula 1aa

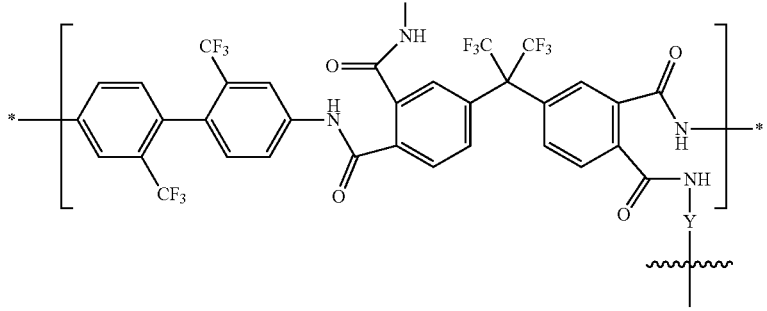

Chemical Formula 1ab

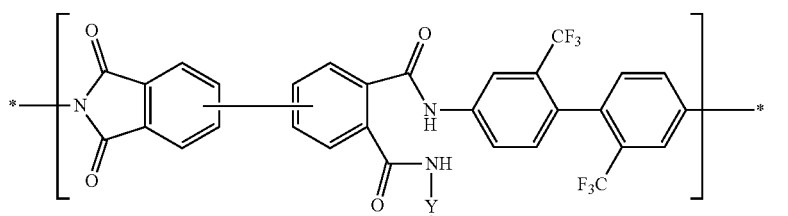

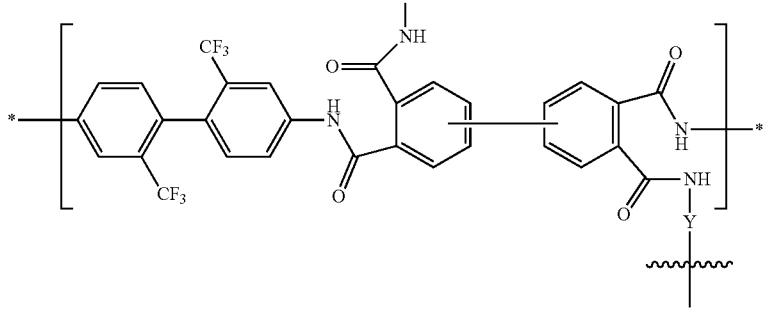

The structural unit represented by Chemical Formula 2 may include a structural unit represented by Chemical Formula 2a.

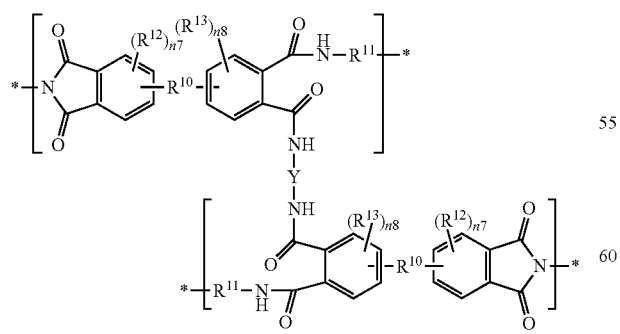

Chemical Formula 2a

In Chemical Formula 2a, $R^{10}$ is the same or different in each structural unit and is independently a single bond or a linking group including a fluorenylene group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof, $R^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (R$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, R$^{12}$ and R$^{13}$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n7 and n8 are the same or different in each structural unit and are independently an integer ranging from 0 to 3, and is a linking point of the polymer main chain.

The structural unit represented by Chemical Formula 2a may include at least one of a structural unit represented by Chemical Formula 2aa and a structural unit represented by Chemical Formula 2ab.

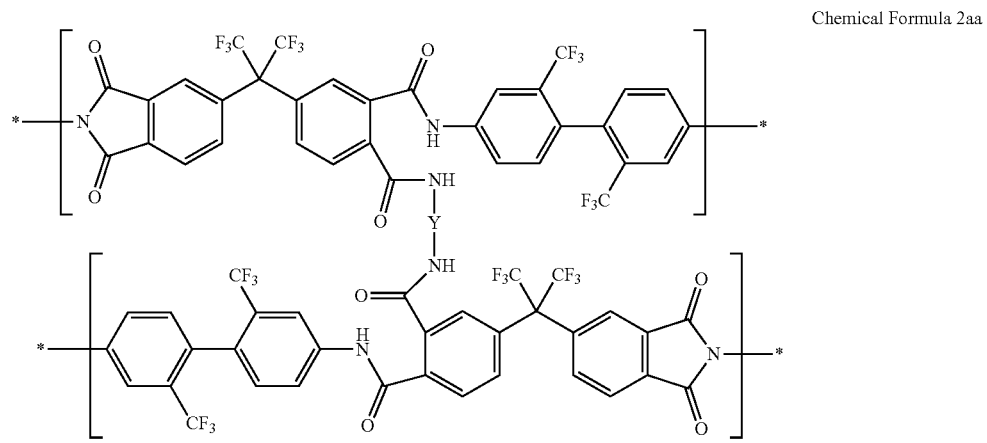

Chemical Formula 2aa

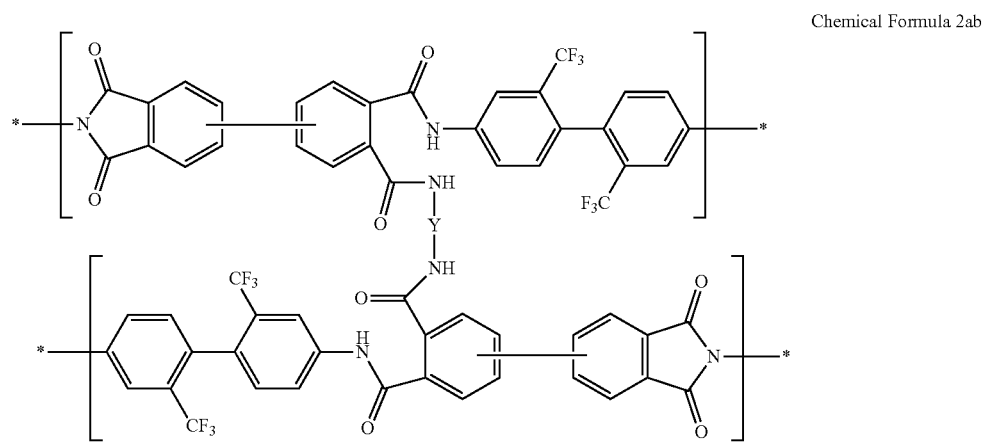

Chemical Formula 2ab

The second imide structural unit may include a structural unit represented by Chemical Formula 3.

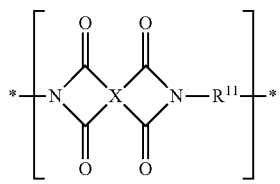

Chemical Formula 3

In Chemical Formula 3,

X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond, a substituted or unsubstituted fluorenyl group, or a linking group including O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, and
is a linking point of the polymer main chain.

The second imide structural unit may include a structural unit represented by Chemical Formula 3a.

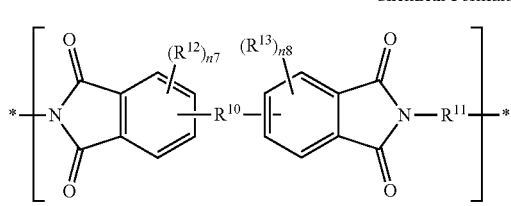

Chemical Formula 3a

In Chemical Formula 3a,

R$^{10}$ is the same or different in each structural unit and is independently a single bond or a linking group including a fluorenylene group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$, or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, R$^{12}$ and R$^{13}$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n7 and n8 are the same or different in each structural unit and are independently an integer ranging from 0 to 3, and
is a linking point of the polymer main chain.

The second imide structural unit may include at least one of a structural unit represented by Chemical Formula 3a and a structural unit represented by Chemical Formula 3b.

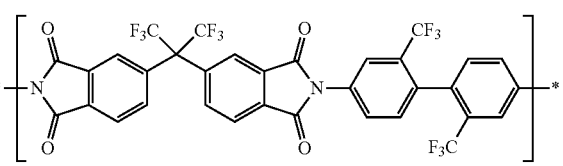

Chemical Formula 3aa

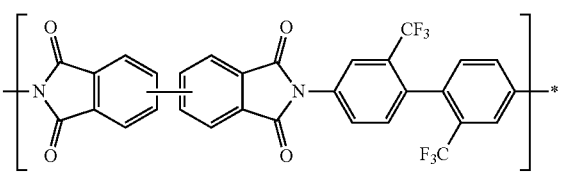

Chemical Formula 3ab

In Chemical Formulae 3aa and 3ab,
is a linking point of the polymer main chain.

The amide structural unit may include a structural unit represented by Chemical Formula 4.

Chemical Formula 4

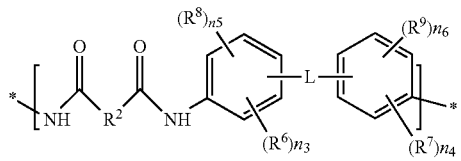

In Chemical Formula 4,

L is the same or different in each structural unit and is independently a single bond, —CONH—, -Ph-CONH-Ph-, or —NHCO-Ph-CONH—, wherein "Ph" is a substituted or unsubstituted phenylene group, $R^2$ is the same or different in each structural unit and is independently a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic or condensed polycyclic non-aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^k$(OH), SiR$^j$R$^m$, or (CR"R$^o$)$_p$ (1≤p≤10) to provide a non-condensed polycyclic aromatic or non-condensed polycyclic non-aromatic group, wherein $R^k$ to $R^o$ are independently hydrogen, a C1 to C30 alkyl group, a C1 to C30 haloalkyl group, a halogen, or a hydroxy group, $R^6$ to $R^9$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n3 and n4 are the same or different in each structural unit and are independently an integer ranging from 0 to 4, n5 and n6 are the same or different in each structural unit and are independently an integer ranging from 0 to 3, n3+n5 is the same or different in each structural unit and is independently an integer ranging from 0 to 4, n4+n6 is the same or different in each structural unit and is independently an integer ranging from 0 to 4, and

* is a linking point of the polymer main chain.

The amide structural unit may include at least one of a structural unit represented by Chemical Formula 4a and a structural unit represented by Chemical Formula 4b.

Chemical Formula 4a

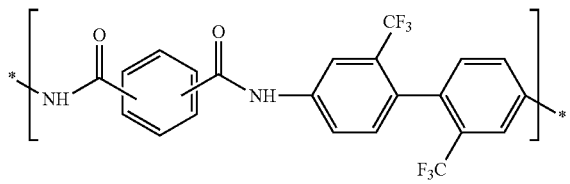

Chemical Formula 4b

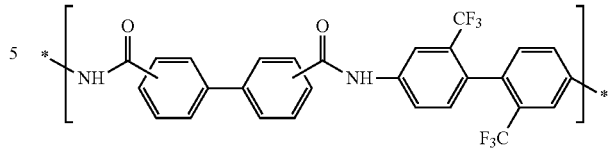

In Chemical Formulae 4a and 4b, * is a linking point of the polymer main chain.

According to another embodiment, a poly(amide-imide) copolymer film includes the poly(amide-imide) copolymer.

The poly(amide-imide) copolymer film may satisfy a modulus of greater than or equal to about 5.8 gigapascals.

The poly(amide-imide) copolymer film may have a light transmittance of greater than or equal to about 80% and a yellow index of less than or equal to about 4.5.

According to another embodiment, a window for a display device includes the poly(amide-imide) copolymer.

According to another embodiment, a display device includes the window for a display device.

According to another embodiment, a display device includes the poly(amide-imide) copolymer film.

According to another embodiment, a poly(amide-imide) copolymer precursor includes a poly(amide-amic acid) copolymer including an amide structural unit and an amic acid structural unit included in a polymer main chain, and a diisocyanate.

The amic acid structural unit may include a structural unit represented by Chemical Formula 5 and the diisocyanate may be represented by Chemical Formula 6.

Chemical Formula 5

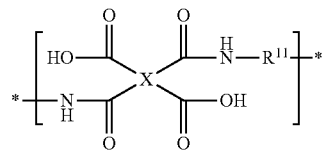

In Chemical Formula 5,

X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond, a substituted or unsubstituted fluorenyl group, or a linking group including O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein $R^a$ to $R^e$ are independently hydrogen, a C1 to C30 alkyl group, a C1 to C30 haloalkyl group, a halogen, or a hydroxy group, $R^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^i$(OH), SiR$^g$R$^h$, or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, and is a linking point of the polymer main chain,

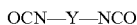   Chemical Formula 6 wherein, in Chemical Formula 6,

Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof.

The amide structural unit may include the structural unit represented by Chemical Formula 4.

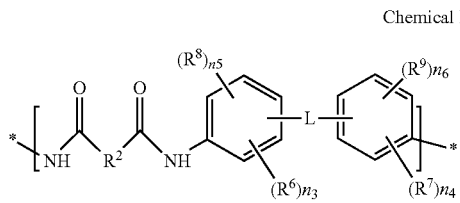   Chemical Formula 4

In Chemical Formula 4,

L is the same or different in each structural unit and is independently a single bond, —CONH—, -Ph-CONH-Ph-, or —NHCO-Ph-CONH—, wherein "Ph" is a substituted or unsubstituted phenylene group, R$^2$ is the same or different in each structural unit and is independently a divalent organic group comprising a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic or condensed polycyclic non-aromatic group; or two or more aromatic or non-aromatic rings are linked by a single bond or a linking group comprising a substituted or unsubstituted fluorenyl group, O, S, C(=O), OC(=O), S(=O), S(=O)$_2$, C(=O)NH, CR$^k$(OH), SiR$^l$R$^m$, or (CR$^n$R$^o$)$_p$ (1≤p≤10) to provide a non-condensed polycyclic aromatic or non-condensed polycyclic non-aromatic group, wherein R$^k$ to R$^o$ are independently hydrogen, a C1 to C30 alkyl group, a C1 to C30 haloalkyl group, a halogen, or a hydroxy group, R$^6$ to R$^9$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n3 and n4 is the same or different in each structural unit and is independently an integer ranging from 0 to 4, n5 and n6 are the same or different in each structural unit and are independently an integer ranging from 0 to 3, n3+n5 is the same or different in each structural unit and is independently an integer ranging from 0 to 4, n4+n6 is the same or different in each structural unit and is independently an integer ranging from 0 to 4, and is a linking point of the polymer main chain.

According to another embodiment, a method of manufacturing a poly(amide-imide) copolymer includes:

preparing a poly(amide-amic acid) copolymer including an amide structural unit and an amic acid structural unit included in a polymer main chain, reacting the poly(amide-amic acid) copolymer with the diisocyanate to prepare a poly(amide-imide) copolymer precursor including a moiety cross-linked to an adjacent polymer main chain through an amide bond, and imidizing the poly(amide-imide) copolymer precursor to obtain a poly(amide-imide) copolymer.

Optical characteristics and mechanical characteristics of the polymer film prepared from the above poly(amide-imide) copolymer may be improved.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
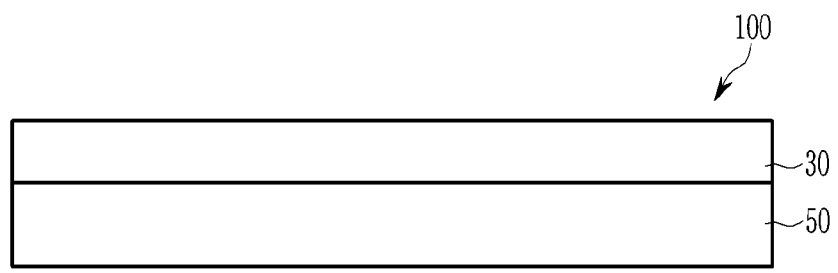
FIG. 1 is a cross-sectional view of a display device according to an embodiment.

Exemplary embodiments will hereinafter be described in detail, and may be readily performed by a person having an ordinary skill in the art.

However, this disclosure may be embodied in many different forms and should not be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a definition is not otherwise provided, the term "substituted" refers to replacement of a hydrogen atom of a compound by a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C1 to C20 haloalkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "hetero" refers to inclusion of one to four heteroatoms selected from N, O, S, Si, and P.

Hereinafter, "combination" refers to a mixture of two or more and a laminate of two or more.

Hereinafter, "imide" refers to imide by itself and refers to imide and amic acid that is a precursor of the imide.

As used herein, the term "alkyl" indicates a group derived from a completely saturated, branched or unbranched (or a straight or linear) hydrocarbon and having a specified number of carbon atoms.

As used herein, the term "haloalkyl" indicates an alkyl group substituted with one or more halogen atoms selected from fluorine, chlorine, bromine, and iodine, wherein the term "alkyl" has the same meaning as described above.

As used herein, the term "alkoxy" represents "alkyl-O—", wherein the term "alkyl" has the same meaning as described above.

As used herein, the term "alkenyl group" indicates a straight or branched chain, monovalent hydrocarbon group having at least one carbon-carbon double bond.

As used herein, the term "alkynyl group" indicates a straight or branched chain, monovalent hydrocarbon group having at least one carbon-carbon triple bond.

As used herein, when a definition is not otherwise provided, the term "aryl" indicates an aromatic hydrocarbon containing at least one ring and having the specified number of carbon atoms.

As used herein, the term "arylalkyl" indicates a substituted or unsubstituted aryl group covalently linked to an alkyl group that is linked to a compound.

As used herein, when a definition is not otherwise provided, the term "heteroaryl group" indicates an aryl group including carbon and 1 to 3 heteroatoms selected from the group consisting of N, O, S, and P as ring atoms.

As used herein, the term "heteroarylalkyl" indicates a substituted or unsubstituted heteroaryl group covalently linked to an alkyl group that is linked to a compound.

As used herein, the term "alkylene" indicates a straight or branched saturated aliphatic hydrocarbon group having a valence of at least two, optionally substituted with one or more substituents where indicated, provided that the valence of the alkylene group is not exceeded.

As used herein, the term "cycloalkylene group" indicates a cyclic hydrocarbon group having a valence of at least two, optionally substituted with one or more substituents where indicated, provided that the valence of the cycloalkylene group is not exceeded.

As used herein, when a definition is not otherwise provided, the term "arylene" indicates a divalent group formed by the removal of two hydrogen atoms from one or more rings of an arene, wherein the hydrogen atoms may be removed from the same or different rings of the arene.

As used herein, the term "heteroarylene group" indicates a functional group having a valence of at least two obtained by removal of two hydrogens in an aromatic ring, containing one to three heteroatoms selected from the group consisting of N, O, S, Si, and P as ring-forming elements, optionally substituted with one or more substituents where indicated, provided that the valence of the alkylene group is not exceeded.

Hereinafter, a poly(amide-imide) copolymer according to an embodiment is described.

A poly(amide-imide) copolymer according to an embodiment may be a copolymer having a main chain including at least one imide structural unit and at least one amide structural unit in the polymer main chain.

At least one imide structural unit may be the same or different and each imide structural unit may have an imide bond (—C(O)—NH—C(O)—) included in the polymer main chain.

At least one amide structural unit may be the same or different and each amide structural unit may have an amide bond (—C(O)—NH—) included in a polymer main chain.

The adjacent polymer main chains of the poly(amide-imide) copolymer may be cross-linked, for example, through an amide bond (a bond between C(O) and NH in the amide bond —C(O)—NH—).

For example, at least one of the imide structural units of the poly(amide-imide) copolymer may include a moiety cross-linked to an adjacent polymer main chain through an amide bond.

For example, the imide structural unit of the poly(amide-imide) copolymer may include:
a first imide structural unit including a moiety cross-linked to an adjacent polymer main chain through an amide bond, and
a second imide structural unit, which is not cross-linked to an adjacent polymer main chain.

The first imide structural unit may include, for example, at least one of a structural unit represented by Chemical Formula 1 and a structural unit represented by Chemical Formula 2.

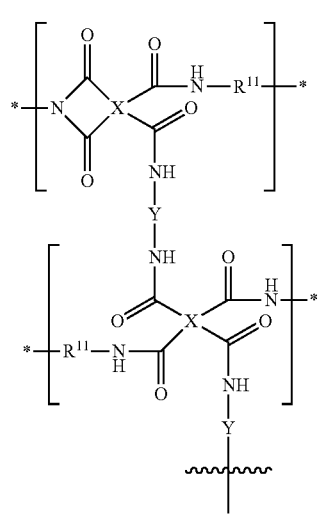

Chemical Formula 1

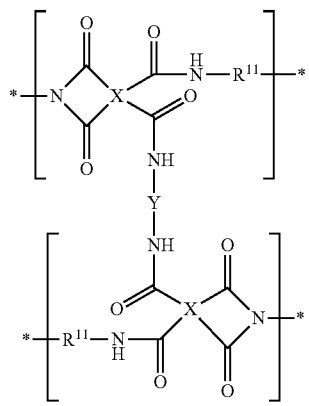

Chemical Formula 2

In Chemical Formula 1 or 2,

X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond, a substituted or unsubstituted fluorenyl group, or a linking group including O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, and

* is a linking point of the polymer main chain.

For example, in Chemical Formula 1 and/or 2, X is the same or different in each structural unit and is independently substituted or unsubstituted benzene, a substituted or unsubstituted naphthalene, a substituted or unsubstituted anthracene, a substituted or unsubstituted phenanthrene, a substituted or unsubstituted pyrene, a substituted or unsubstituted benzopyrene, a substituted or unsubstituted perylene, a substituted or unsubstituted biphenylene, a substituted or unsubstituted bridged biphenylene, a substituted or unsubstituted 5-membered or 6-membered heterocycle, a substituted or unsubstituted cycloalkane, a substituted or unsubstituted bridged bicycloalkane, a fused ring thereof, or a combination thereof, but is not limited thereto.

Herein the bridged biphenylene and the bridged bicycloalkane may be linked by, for example, a fluorenylene group or a linking group including O, S, C(=O), OC(=O), S(=O), S(=O)$_2$, C(=O)NH, CR$^a$(OH), SiR$^b$R$^c$, or (CR$^d$R$^e$)$_p$ (wherein, R$^a$ to R$^e$ are independently hydrogen, a C1 to C30 alkyl group, a C1 to C30 haloalkyl group, a halogen, or a hydroxy group, 1≤p≤10), but are not limited thereto.

For example, in Chemical Formula 1 and/or 2, X may be selected from groups of Group 1, but is not limited thereto.

Group 1

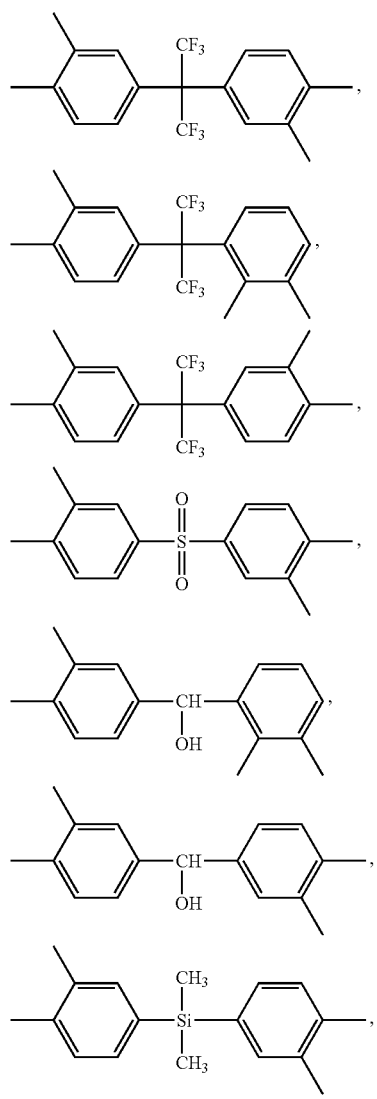

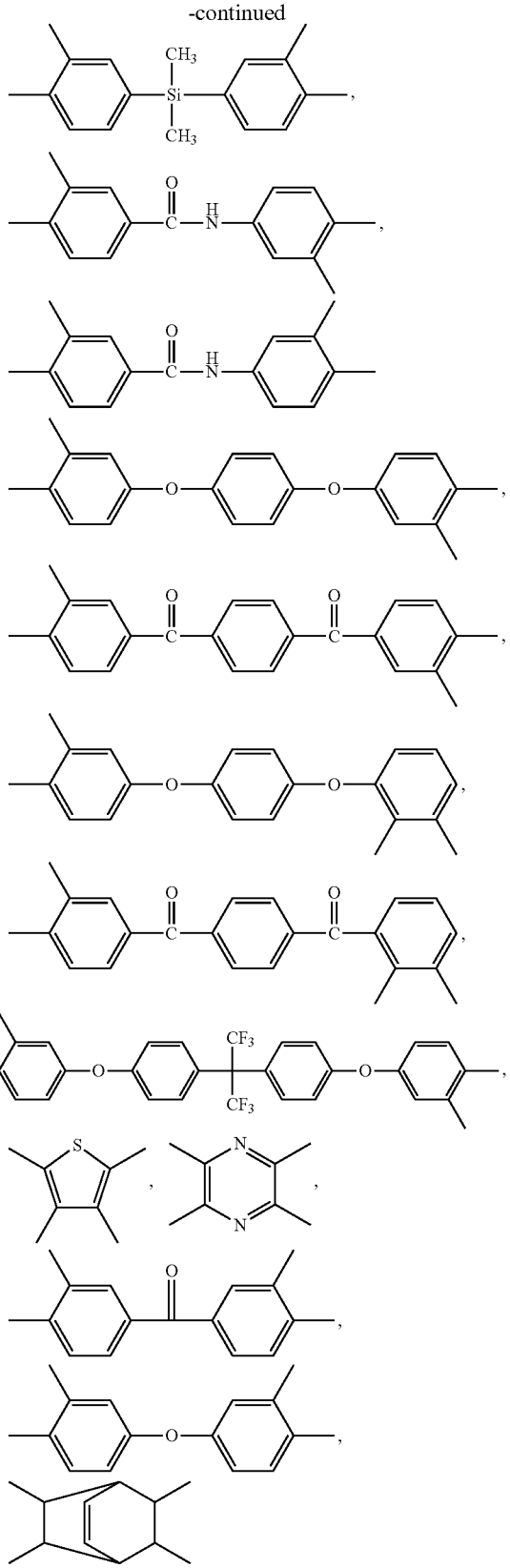

For example, in Chemical Formula 1 and/or 2, Y may be the same or different in each structural unit and may independently be a substituted or unsubstituted C1 to C20 alkylene group, a substituted or unsubstituted phenylene group, a substituted or unsubstituted naphthylene group, a substituted or unsubstituted biphenylene group, or in combination thereof, but it not limited thereto.

For example, in Chemical Formula 1 and/or 2, $R^{11}$ may be the same or different in each structural unit and may independently be selected from groups of Group 2, but is not limited thereto.

Group 2

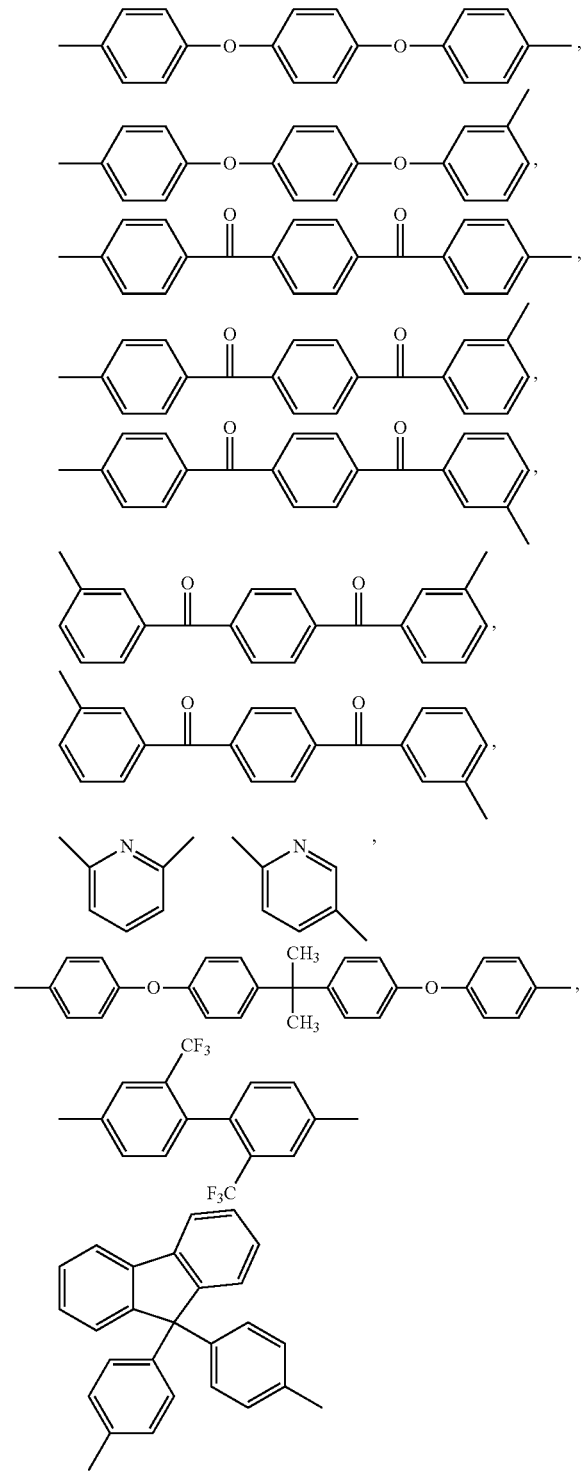
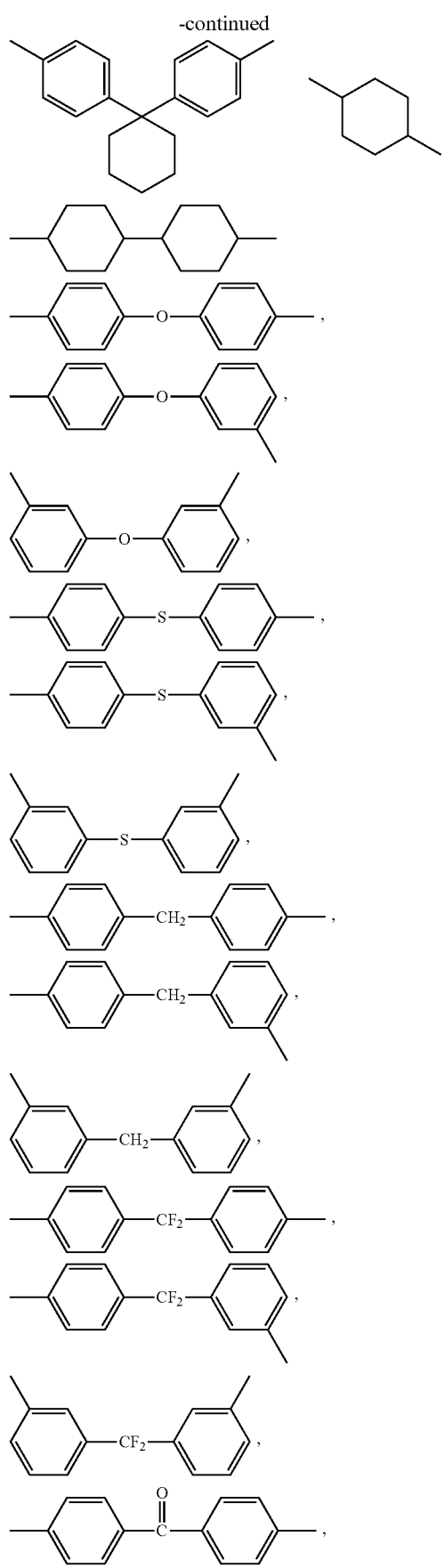

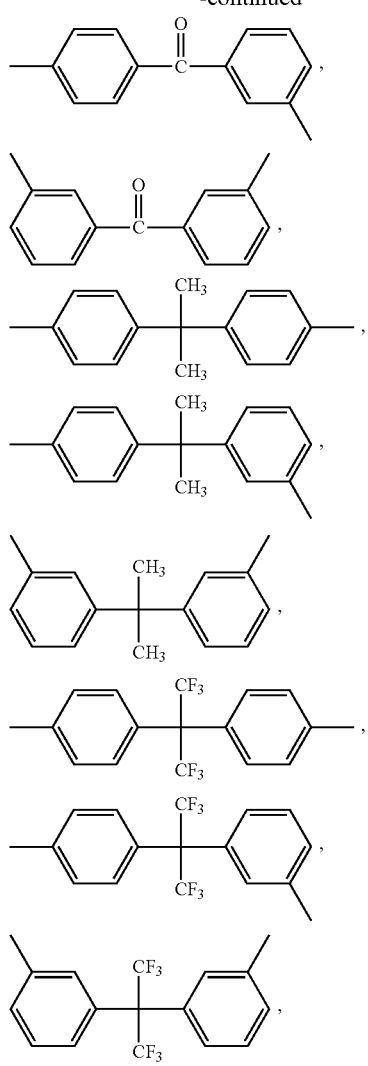
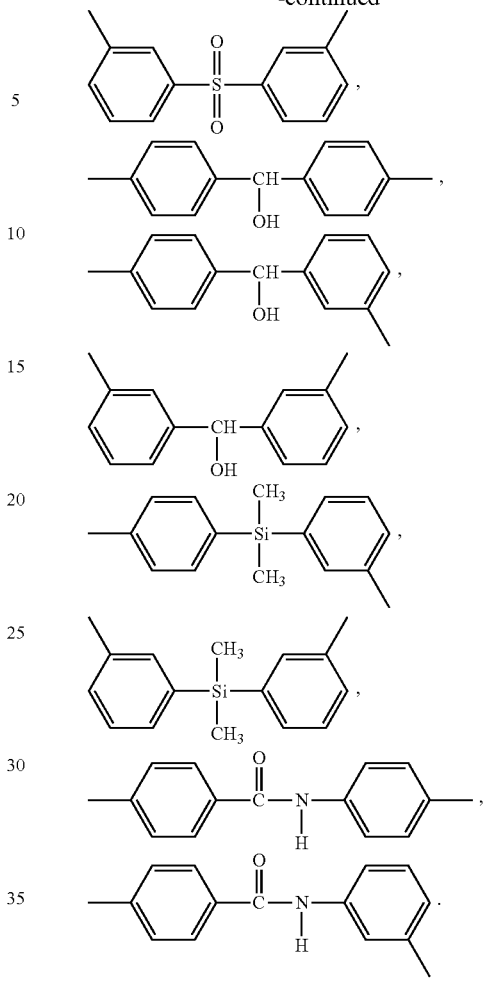
For example, the first imide structural unit represented by Chemical Formula 1 may include, for example, a structural unit represented by Chemical Formula 1a.
Chemical Formula 1a
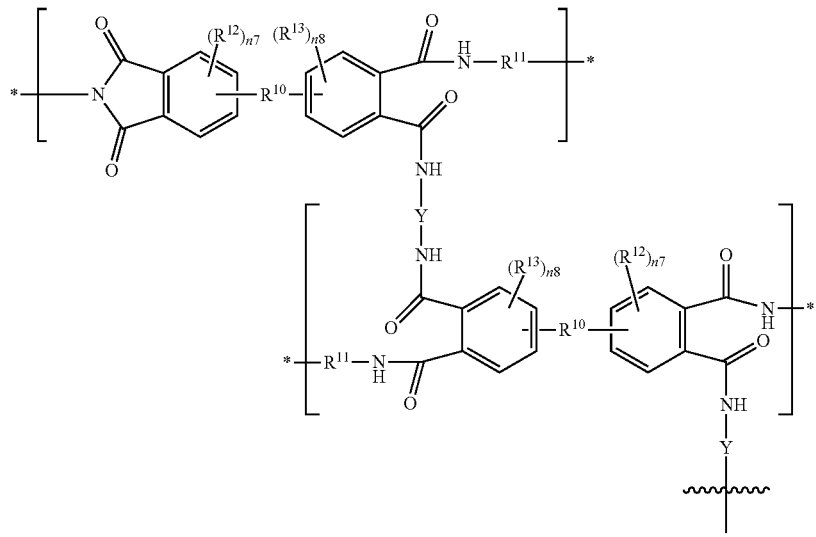

In Chemical Formula 1a,

R[10] is the same or different in each structural unit and is independently a single bond or a linking group including a fluorenylene group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof, R[11] is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, R[12] and R[13] are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n7 and n8 are the same or different in each structural unit and are independently an integer ranging from 0 to 3, and is a linking point of the polymer main chain.

For example, the first imide structural unit represented by Chemical Formula 1a may include, for example, at least one of a structural unit represented by Chemical Formula 1aa and a structural unit represented by Chemical Formula 1ab, but is not limited thereto.

Chemical Formula 1aa

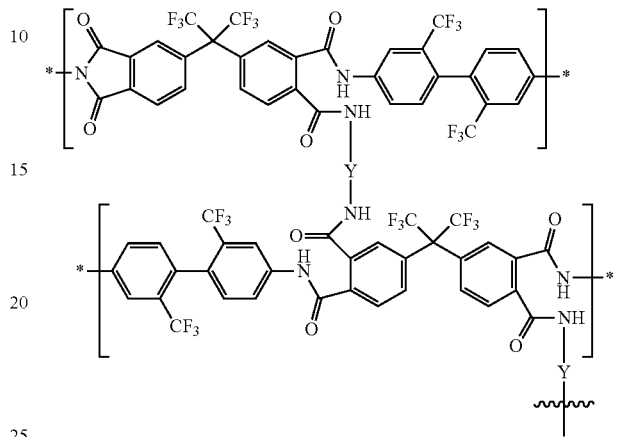

Chemical Formula 1ab

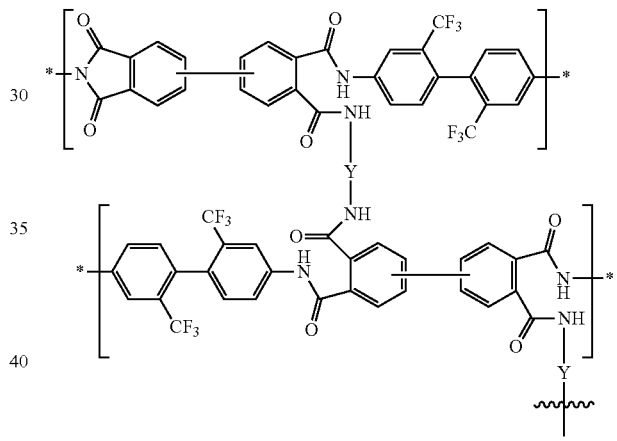

For example, the first imide structural unit represented by Chemical Formula 2 may include, for example, a structural unit represented by Chemical Formula 2a.

Chemical Formula 2a

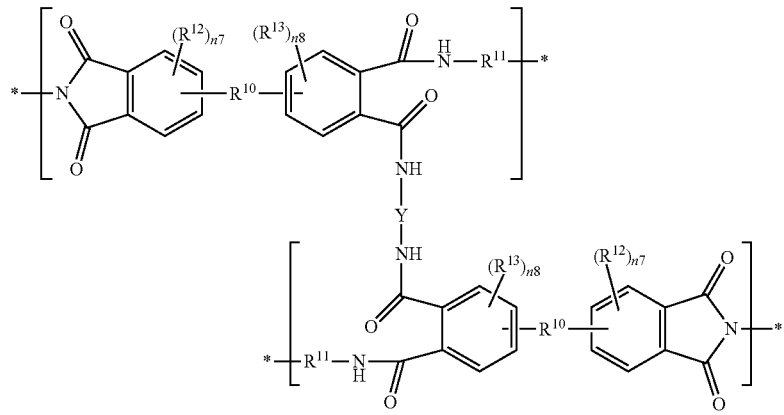

In Chemical Formula 2a,

R$^{10}$ is the same or different in each structural unit and is independently a single bond or a linking group including a fluorenylene group, O, S, C(=O), OC(=O), S(=O), S(=O)$_2$, (=O)NH, CR$^a$(OH), SiR$^b$R$^c$, or (R$^d$R$^e$)$_p$ (1≤p≤10), wherein R$^a$ to R are independently hydrogen, a C1 to C30 alkyl group, a C1 to C30 haloalkyl group, a halogen, or a hydroxy group, Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, R$^{12}$ and R$^{13}$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n7 and n8 are the same or different in each structural unit and are independently an integer ranging from 0 to 3, and is a linking point of the polymer main chain.

For example, the first imide structural unit represented by Chemical Formula 2a may include, for example, at least one of a structural unit represented by Chemical Formula 2aa and a structural unit represented by Chemical Formula 2ab, but is not limited thereto.

Chemical Formula 2aa

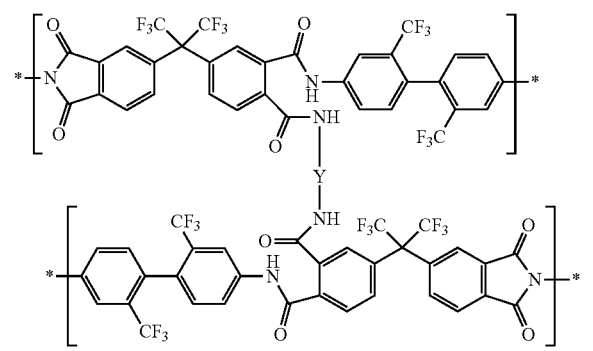

Chemical Formula 2ab

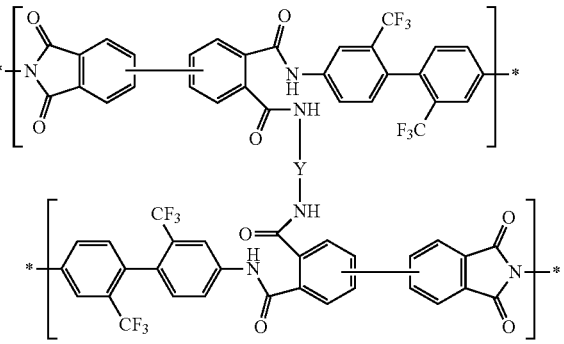

The second imide structural unit may include, for example, a structural unit represented by Chemical Formula 3.

Chemical Formula 3

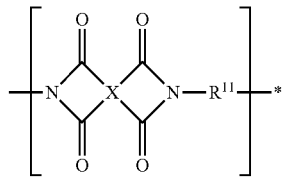

In Chemical Formula 3,

X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond, a substituted or unsubstituted fluorenyl group, or a linking group including O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$, or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, and is a linking point of the polymer main chain.

For example, in Chemical Formula 3, X may be the same or different in each structural unit and is independently substituted or unsubstituted benzene, a substituted or unsubstituted naphthalene, a substituted or unsubstituted anthracene, a substituted or unsubstituted phenanthrene, a substituted or unsubstituted pyrene, a substituted or unsubstituted benzopyrene, a substituted or unsubstituted perylene, a substituted or unsubstituted biphenylene, a substituted or unsubstituted bridged biphenylene, a substituted or unsubstituted 5-membered or 6-membered heterocycle, a substituted or unsubstituted cycloalkane, a substituted or unsubstituted bridged bicycloalkane, a fused ring thereof, or a combination thereof, but is not limited thereto.

Herein the bridged biphenylene and the bridged bicycloalkane may be linked by, for example, a fluorenylene group or a linking group including O, S, C(=O), OC(=O), S(=O), S(=O)$_2$, C(=O)NH, CR$^a$(OH), SiR$^b$R$^c$, or (CR$^d$R$^e$)$_p$ (wherein, R$^a$ to R$^e$ are independently hydrogen, a C1 to C30 alkyl group, a C1 to C30 haloalkyl group, a halogen, or a hydroxy group, 1≤p≤10), but are not limited thereto.

For example, the second imide structural unit represented by Chemical Formula 3 may include, for example, a structural unit represented by Chemical Formula 3a.

Chemical Formula 3a

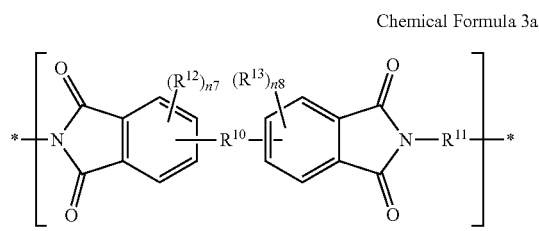

In Chemical Formula 3a,

R$^{10}$ is the same or different in each structural unit and is independently a single bond or a linking group including a fluorenylene group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10)), wherein R$^a$ to R$^e$ are independently hydrogen, a C1 to C30 alkyl group, a C1 to C30 haloalkyl group, a halogen, or a hydroxy group, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (CR$^i$R$^j$)$_p$ (1≤p≤10)) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, R$^{12}$ and R$^{13}$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n7 and n8 are the same or different in each structural unit and are independently an integer ranging from 0 to 3, and is a linking point of the polymer main chain.

For example, the second imide structural unit represented by Chemical Formula 3a may include, for example, at least one of a structural unit represented by Chemical Formula 3aa and a structural unit represented by Chemical Formula 3ab, but is not limited thereto.

Chemical Formula 3aa

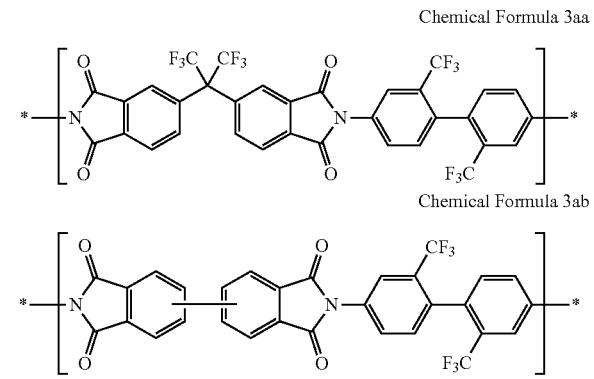

Chemical Formula 3ab

In Chemical Formulae 3aa and 3ab, * is a linking point of the polymer main chain.

The first imide structural unit and the second imide structural unit may be included in a mole ratio of about 1:99 to about 99:1.

Within the above range, the first imide structural unit and the second imide structural unit may be, for example, included in a mole ratio of about 5:95 to about 95:5 or about 10:90 to about 90:10.

The amide structural unit of the poly(amide-imide) copolymer may include, for example, a structural unit represented by Chemical Formula 4.

Chemical Formula 4

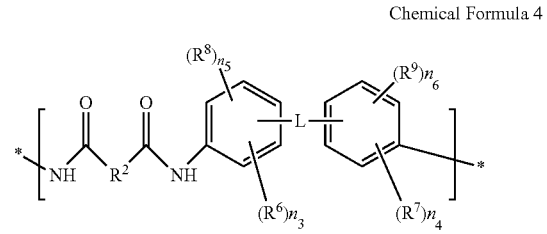

In Chemical Formula 4,

L is the same or different in each structural unit and is independently a single bond, —CONH—, -Ph-CONH-Ph- or —NHCO-Ph-CONH—, wherein "Ph" is a substituted or unsubstituted phenylene group, R$^2$ is the same or different in each structural unit and is independently a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic or condensed polycyclic non-aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^k$(OH), SiR$^l$R$^m$, or (CR$^n$R$^o$)$_p$ (1≤p≤10) to provide a non-condensed polycyclic aromatic or non-condensed polycyclic non-aromatic group, wherein R$^k$ to R$^o$ are independently hydrogen, a C1 to C30 alkyl group, a C1 to C30 haloalkyl group, a halogen, or a hydroxy group, R$^6$ to R$^9$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n3 and n4 is the same or different in each structural unit and is independently an integer ranging from 0 to 4, n5 and n6 are the same or different in each structural unit and are independently an integer ranging from 0 to 3, n3+n5 is the same or different in each structural unit and is independently an integer ranging from 0 to 4, n4+n6 is the same or different in each structural unit and is independently an integer ranging from 0 to 4, and

* is a linking point of the polymer main chain.

For example, the amide structural unit represented by Chemical Formula 4 may include, for example, at least one of a structural unit represented by Chemical Formula 4a and a structural unit represented by Chemical Formula 4b, but is not limited thereto.

Chemical Formula 4a

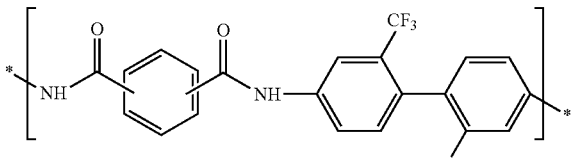

Chemical Formula 4b

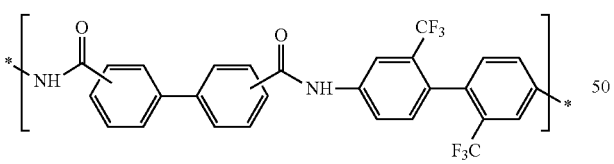

In Chemical Formulae 4a and 4b, * is a linking point of the polymer main chain.

In the poly(amide-imide) copolymer according to an embodiment, the imide structural unit and the amide structural unit may be, for example, included in a mole ratio of about 10:90 to about 90:10.

Within the above range, the imide structural unit and the amide structural unit may be, for example, included in a mole ratio of about 10:90 to about 70:30 or about 10:90 to about 50:50.

The poly(amide-imide) copolymer according to an embodiment may be obtained from a poly(amide-imide) copolymer precursor.

A poly(amide-imide) copolymer precursor according to an embodiment may include a poly(amide-amic acid) copolymer and a diisocyanate.

The poly(amide-amic acid) copolymer may include an amide structural unit and an amic acid structural unit included in a polymer main chain.

The amide structural unit is the same as above and may include, for example, the structural unit represented by Chemical Formula 4.

The amic acid structural unit may include, for example, a structural unit represented by Chemical Formula 5.

Chemical Formula 5

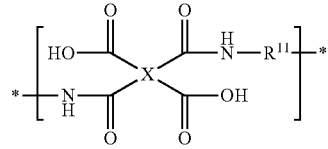

In Chemical Formula 5,

X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond, a substituted or unsubstituted fluorenyl group, or a linking group including O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, R$^{11}$ is the same or different in each structural unit and is independently a single bond or a divalent organic group including a substituted or unsubstituted C6 to C30 aromatic or non-aromatic ring, wherein the aromatic or non-aromatic ring is present as a single ring; two or more aromatic or non-aromatic rings are condensed to provide a condensed polycyclic aromatic group; or two or more aromatic or non-aromatic rings are linked by a single bond, a substituted or unsubstituted fluorenyl group, or a linking group of O, S, C(=O), OC(=O), S(=O), S(=O)$_2$, C(=O)NH, CR$^f$(OH), SiR$^g$R$^h$ or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group, and

* is a linking point of the polymer main chain.

The diisocyanate may be, for example, represented by Chemical Formula 6.

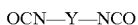            Chemical Formula 6

In Chemical Formula 6,

Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof.

For example, the diisocyanate may be an alkylene diisocyanate such as hexamethylene diisocyanate, toluene diisocyanate, isophoronediisocyanate, or a combination thereof, but is not limited thereto.

The diisocyanate may be included in an amount of less than or equal to about 200 mole percent (mol %) based on the total amount of the anhydride used for preparation of the poly(amide-imide) copolymer precursor.

While not wishing to be bound by theory, it is understood that within the above range, optical characteristics and mechanical characteristics of the poly(amide-imide) copolymer may be further effectively achieved.

Within the above range, the diisocyanate may be included in an amount of about 0.1 mol % to about 150 mol %, about 1 mol % to about 100 mol %, about 1 mol % to about 50 mol %, or about 1 mol % to about 10 mol %, but is not limited thereto.

The poly(amide-imide) copolymer may be, for example, manufactured by:
preparing a poly(amide-amic acid) copolymer,
reacting the poly(amide-amic acid) copolymer with the diisocyanate to prepare a poly(amide-imide) copolymer precursor including a moiety cross-linked to an adjacent polymer main chain through an amide bond, and
imidizing the poly(amide-imide) copolymer precursor to obtain a poly(amide-imide) copolymer.

The poly(amide-amic acid) copolymer may be obtained by reacting an anhydride, a diamine compound, and a dicarboxylic acid derivative.

For example, the poly(amide-amic acid) copolymer may be obtained by first reacting a dicarboxyl derivative with a diamine compound to form an amide structural unit, adding an anhydride thereto, and reacting them to link an amide structural unit with an amic acid structural unit and to obtain the poly(amide-amic acid) copolymer.

For example, the poly(amide-amic acid) copolymer may be obtained by first reacting a dicarboxyl derivative with a diamine compound to obtain an oligomer (hereinafter, "amide oligomer") including an amide group and amino groups at both terminal ends, and reacting the amide oligomer as a diamine compound with an anhydride to obtain the poly(amide-amic acid) copolymer.

For example, the poly(amide-amic acid) copolymer may be obtained by reacting an anhydride, a diamine compound, and a dicarboxylic acid derivative.

The anhydride may be, for example, tetracarboxylic acid dianhydride, for example, tetracarboxylic acid dianhydride represented by Chemical Formula 7, but is not limited thereto.

Chemical Formula 7

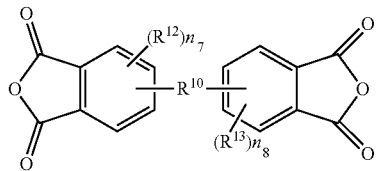

In Chemical Formula 7, $R^{10}$, $R^{12}$, $R^{13}$, n7, and n8 are the same as described above.

The anhydride may be, for example, 2,3,3',4'-biphenyltetracarboxylic dianhydride, 2,3,3',4'-diphenylsulfone tetracarboxylic dianhydride, 3,4'-oxydiphthalic anhydride, 3,3',4,4'-biphenyltetracarboxylic dianhydride (BPDA), bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride (6FDA), 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride, or a combination thereof, but is not limited thereto.

The diamine compound may be, for example, represented by Chemical Formula 8, but is not limited thereto.

Chemical Formula 8

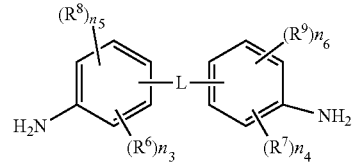

In Chemical Formula 8, L, $R^6$ to $R^9$, and n3 to n6 are the same as described above.

The diamine compound may be, for example, 2,2'-bis(trifluoromethyl)benzidine (TFDB), but is not limited thereto.

The dicarboxylic acid derivative may be, for example, represented by Chemical Formula 9, but is not limited thereto.

$$X^1\text{—CO—}R^2\text{—CO—}X^2 \quad\quad \text{Chemical Formula 9}$$

In Chemical Formula 9,
$R^2$ is the same as described above and $X^1$ and $X^2$ are independently a halogen.

The dicarboxylic acid derivative may be, for example, 4,4'-biphenyl dicarbonyl chloride (BPCL), terephthaloyl chloride (TPCL), or a combination thereof, but is not limited thereto.

The poly(amide-imide) copolymer precursor may be obtained by mixing the poly(amide-amic acid) copolymer with the diisocyanate.

The diisocyanate may be included in an amount of less than or equal to about 200 mol % based on the total amount of the anhydride used for preparation of the poly(amide-imide) copolymer precursor.

Within the above range, it may be, for example, included in an amount of about 0.1 mol % to about 200 mol %, about 0.1 mol % to about 150 mol %, about 1 mol % to about 100 mol %, about 1 mol % to about 50 mol %, or about 1 mol % to about 10 mol %, but is not limited thereto.

Within these ranges, optical characteristics and mechanical characteristics of the poly(amide-imide) copolymer may be further effectively satisfied.

The poly(amide-imide) copolymer precursor may further include a reaction catalyst.

The reaction catalyst is not particularly limited and may be, for example, a tertiary amine compound, such as triethylamine, but is not limited thereto.

The reacting may be carried out in a solvent, which may be an aprotic polar solvent. The aprotic polar solvent may include a sulfoxide-containing solvent such as dimethylsulfoxide (DMSO) and diethylsulfoxide, a formamide-containing solvent such as N,N-dimethyl formamide (DMF) and N,N-diethylformamide, an acetamide-containing solvent such as N,N-dimethyl acetamide (DMA), N,N-dimethyl-methoxyacetamide, and N,N-diethylacetamide, a pyrrolidone-containing solvent such as N-methyl-2-pyrrolidone (NMP), N-acetyl-2-pyrrolidone, and N-vinyl-2-pyrrolidone, a phenol-containing solvent such as phenol, o-cresol, m-cresol, p-cresol, xylenol, halogenated phenol, and catechol, hexamethylphosphoramide, γ-butyrolactone, tetrahydrothiophene dioxide, N-methyl-b-caprolactam, N,N,N',N'-tetramethylurea, or a mixture thereof. However, this disclosure is not limited to an aprotic polar solvent, and an aromatic hydrocarbon solvent such as xylene or toluene may be used.

The imidizing of the poly(amide-imide) copolymer precursor may be, for example, performed by heat treating at about 200° C. to about 500° C., for example, about 250° C. to about 400° C., for several seconds to several minutes, but is not limited thereto.

The poly(amide-imide copolymer) may be prepared in a film form.

The poly(amide-imide copolymer) film may have, for example, a thickness of about 20 micrometers (μm) to about 200 μm.

Within this range, the poly(amide-imide copolymer) film may have a thickness of about 30 μm to about 150 μm or about 30 μm to about 100 μm.

The poly(amide-imide copolymer) film may be, for example, a transparent film.

The poly(amide-imide copolymer) film may have, for example, a light transmittance of greater than or equal to about 80% in a visible ray region of about 380 nanometers (nm) to about 780 nm.

Within this range, the poly(amide-imide copolymer) film may have a light transmittance of greater than or equal to about 85%.

The poly(amide-imide copolymer) film may have, for example, a yellow index (YI) of less than or equal to about 4.5 (absolute value).

Within this range, the poly(amide-imide copolymer) film may have, for example, a yellow index of less than or equal to about 4.0 (absolute value) or less than or equal to about 3.5.

Herein the yellow index may be measured according to ASTM D1925 standard.

The poly(amide-imide copolymer) film may have, for example, a haze of less than or equal to about 1.0.

Within this range, the poly(amide-imide copolymer) film may have a haze of less than or equal to about 0.8.

The poly(amide-imide copolymer) film may have, for example, a modulus of greater than or equal to about 5.8 gigapascals (GPa).

Within this range, the poly(amide-imide copolymer) film may have, for example, a modulus of greater than or equal to about 6.0 GPa.

Within this range the poly(amide-imide copolymer) film may have, for example, a modulus of about 5.8 GPa to 10 GPa or about 6.0 GPa to about 10 GPa.

While not wishing to be bound by theory, it is understood that the poly(amide-imide copolymer) film may improve mechanical characteristics due to the modulus included within these ranges.

The poly(amide-imide copolymer) film may have, for example, a pencil hardness of greater than or equal to about 2H.

Herein the pencil hardness is measured according to ASTM D3363.

The poly(amide-imide copolymer) film may be used in any object requiring transparency and may be, for example, effectively used as a transparent substrate, a transparent protective layer, a transparent insulation layer, or a window for a display device.

Hereinafter, the poly(amide-imide) film used as a window for a display device is described.

FIG. 1 is a cross-sectional view showing a display device according to an embodiment.

Referring to FIG. 1, a display device 100 according to an embodiment includes a display panel 50 and a window 30.

The display panel 50 may be, for example, an organic light emitting panel or a liquid crystal panel, for example, a bendable display panel, a foldable display panel, or a rollable display panel.

The window 30 may be the poly(amide-imide) copolymer film and may be disposed toward an observer side.

Another layer may be disposed between the display panel 50 and the window 30, and for example, a single layer or plural layers of polymer layer (not shown) and/or a transparent adhesive layer (not shown) may be further included.

Figure 2:
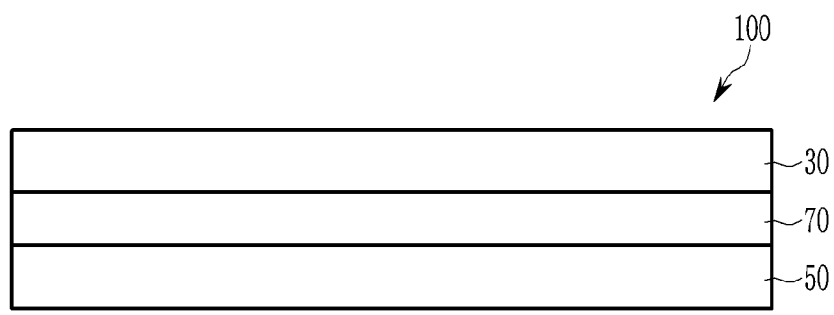
FIG. 2 is a cross-sectional view of a display device according to another embodiment.

FIG. 2 is a cross-sectional view showing a display device according to another embodiment.

Referring to FIG. 2, a display device according to the present embodiment includes a display panel 50, a window 30, and a touch screen panel 70.

The display panel 50 may be, for example, an organic light emitting panel or a liquid crystal panel, for example, a bendable display panel, a foldable display panel, or a rollable display panel.

The window 30 may be the poly(amide-imide) copolymer film and may be disposed toward an observer side.

The touch screen panel 70 may be disposed to be adjacent to each of the window 30 and the display panel 50 to recognize the touched position and the position change when is touched by a human hand or a material through the window 30 and then to output a touch signal.

The driving module (not shown) may monitor a position where is touched from the output touch signal; recognize an icon marked at the touched position; and control to carry out functions corresponding to the recognized icon, and the function performance results are expressed on the display panel 50.

Another layer may be disposed between the touch screen panel 70 and the window 30, and for example, a single layer or plural layers of polymer layer (not shown) and/or a transparent adhesive layer (not shown) may be further included.

Another layer may be disposed between the display panel 50 and the window 30, and for example, a single layer or plural layers of polymer layer (not shown) and/or a transparent adhesive layer (not shown) may be further included.

The display device may be applied to various electronic devices, for example, a smart phone, a tablet PC, a camera, a touch screen device, but is not limited thereto.

Hereinafter, the embodiments are illustrated in more detail with reference to examples. However, these examples are exemplary, and the scope of the present disclosure is not limited thereto.

Synthesis Example: Synthesis of Poly(amide-imide) Copolymer

Synthesis Example 1

Step 1

700 grams (g) of N,N-dimethyl acetamide as a solvent is placed in a round-bottomed flask, 1 mol equivalent (0.127 moles (mol), 40.80 g) of 2,2'-bis(trifluoromethyl)benzidine (TFDB) and 2.4 mol equivalent (0.306 mol, 21.49 g) of pyridine are dissolved therein, and 50 milliliters (ml) of N,N-dimethyl acetamide is additionally added thereto to completely dissolve TFDB. Subsequently, 0.6 mol equivalent (0.076 mol, 15.52 g) of terephthaloic dichloride (TPCl) is four times separately added to the solution at 25° C., and the mixture is vigorously stirred for 15 minutes. The resulting solution is stirred under a nitrogen atmosphere for 2 hours, 7 liters (L) of a NaCl solution containing 350 g of NaCl is added thereto for 10 minutes, and the mixture is additionally stirred. Subsequently, a solid produced therein is filtered and then twice resuspended and refiltered in 5 L of deionized water. Then, a final filtrate on a filter is appropriately pressed to remove remaining water at maximum and dried at 90° C. under vacuum for 48 hours to obtain an amide oligomer represented by Chemical Formula A. The amide oligomer has a number average molecular weight of about 997.

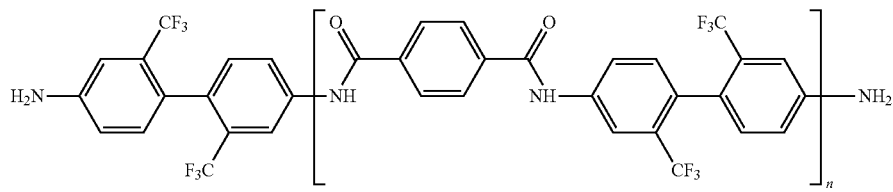

Chemical Formula A

Step 2

20 g (0.02 mol) of the amide oligomer is placed in a 250 ml 4-neck double wall reactor equipped with a mechanical stirrer and a nitrogen inlet and preheated at 30° C., and 143 ml of dimethyl acetamide (DMAc) is added thereto.

After stirring the solution at 30° C. under a nitrogen atmosphere, the amide oligomer is completely dissolved, 4.46 g (0.1 mol) of 2,2-bis-(3,4-dicarboxylphenyl)hexafluoropropane dianhydride (6FDA) and 2.95 g (0.1 mol) of 3,3',4,4'-biphenyltetracarboxylic dianhydride (BPDA) are slowly added thereto. Subsequently, 10 ml of dimethyl acetamide (DMAc) is additionally added thereto to wash remaining BPDA, and the resulting solution is stirred for 48 hours to obtain a poly(amide-amic acid) copolymer having a solid concentration of 16%.

Step 3

100 g of the poly(amide-amic acid) copolymer is placed in a 250 ml 4-neck double wall reactor equipped with a mechanical stirrer and a nitrogen inlet, 36.29 milligrams (mg) of hexamethylenediisocyanate (2.5 mole percent (mol %) based on the total amount of the anhydride) is added thereto, and the mixture is stirred for 24 hours under a nitrogen atmosphere to obtain a poly(amide-amic acid) copolymer into which a cross-linking structure is introduced (a poly(amide-imide) copolymer precursor). Subsequently, 1.76 g of anhydrous acetic acid is added thereto, the obtained mixture is stirred for 30 minutes, 1.365 g of pyridine is added thereto, and the obtained mixture is additionally stirred for 24 hours to obtain a poly(amide-imide) copolymer in which the cross-linking structure is introduced.

Synthesis Example 2

A poly(amide-imide) copolymer is obtained according to the same method as Synthesis Example 1 except for adding 5.0 mol % of hexamethylenediisocyanate in Step 3 of Synthesis Example 1.

Synthesis Example 3

A poly(amide-imide) copolymer is obtained according to the same method as Synthesis Example 1 except for adding 7.5 mol % of hexamethylenediisocyanate in Step 3 of Synthesis Example 1.

Synthesis Example 4

A poly(amide-imide) copolymer is obtained according to the same method as Synthesis Example 1 except for adding 10.0 mol % of hexamethylenediisocyanate in Step 3 of Synthesis Example 1.

Synthesis Example 5

A poly(amide-imide) copolymer is obtained according to the same method as Synthesis Example 1 except for adding 10.0 mol % of toluene diisocyanate instead of the hexamethylenediisocyanate in Step 3 of Synthesis Example 1.

Synthesis Example 6

A poly(amide-imide) copolymer is obtained according to the same method as Synthesis Example 1 except for changing Step 3 of Synthesis Example 1 as follows.

Step 3

100 g of the poly(amide-amic acid) copolymer obtained in Step 2 of Synthesis Example 1 is placed in a 250 ml 4-neck double wall reactor equipped with a mechanical stirrer and a nitrogen inlet, and dimethyl acetamide is added thereto for dilution. Subsequently, 1.2 ml (0.009 mol) of triethylamine (TEA) (100 mol % based on the total amount of the anhydride) and 1.29 ml (0.009 mol) of toluene diisocyanate (100 mol % based on the total amount of the anhydride) are added thereto, and the obtained mixture is stirred for 24 hours under a nitrogen atmosphere to obtain a poly(amide-amic acid) copolymer into which a cross-linking structure is introduced (a poly(amide-imide) copolymer precursor).

Synthesis Example 7

A poly(amide-imide) copolymer is obtained according to the same method as Synthesis Example 6 except for adding 25 mol % of isophorone diisocyanate (IPDI) instead of the toluene diisocyanate in Step 3 of Synthesis Example 6.

Synthesis Example 8

A poly(amide-imide) copolymer is obtained according to the same method as Synthesis Example 6 except for adding 50 mol % of isophorone diisocyanate (IPDI) instead of the toluene diisocyanate in Step 3 of Synthesis Example 6.

Synthesis Example 9

A poly(amide-imide) copolymer is obtained according to the same method as Synthesis Example 6 except for adding 100 mol % of isophorone diisocyanate (IPDI) instead of the toluene diisocyanate in Step 3 of Synthesis Example 6.

Synthesis Example 10

A poly(amide-imide) copolymer is obtained according to the same method as Synthesis Example 6 except for adding 110 mol % of isophorone diisocyanate (IPDI) instead of the toluene diisocyanate in Step 3 of Synthesis Example 6.

Comparative Synthesis Example 1

A poly(amide-imide) copolymer is obtained according to the same method as Synthesis Example 1 except for changing Step 3 of Synthesis Example 1.

Step 3

100 g of the poly(amide-amic acid) copolymer obtained in Step 2 of Synthesis Example 1 is placed in a 250 ml 4-neck double wall reactor equipped with a mechanical stirrer and a nitrogen inlet, 1.76 g of anhydrous acetic acid is added thereto, and the mixture is stirred for 30 minutes.

Subsequently, 1.365 g of pyridine is added thereto, and the mixture is additionally stirred for 24 hours to obtain a poly(amide-imide) copolymer.

EXAMPLES

Example 1

The poly(amide-imide) copolymer of Synthesis Example 1 is coated on a glass plate and dried on an 80° C. hot plate for one hour, and the glass plate coated with the poly(amide-imide) copolymer is placed in an oven, heat-treated up to 250° C. at 3 degrees Centigrade per minute (° C./min), and slowly cooled down.

Subsequently, the glass plate is removed to form an about 49 micrometer-thick (μm-thick) poly(amide-imide) copolymer film.

Example 2

An about 48 μm-thick poly(amide-imide) copolymer film is obtained according to the same method as Example 1, except for using the poly(amide-imide) copolymer of Synthesis Example 2 instead of the poly(amide-imide) copolymer of Synthesis Example 1.

Example 3

An about 50 μm-thick poly(amide-imide) copolymer film is obtained according to the same method as Example 1, except for using the poly(amide-imide) copolymer of Synthesis Example 3 instead of the poly(amide-imide) copolymer of Synthesis Example 1.

Example 4

An about 52 μm-thick poly(amide-imide) copolymer film is obtained according to the same method as Example 1, except for using the poly(amide-imide) copolymer of Synthesis Example 4 instead of the poly(amide-imide) copolymer of Synthesis Example 1.

Example 5

An about 52 μm-thick poly(amide-imide) copolymer film is obtained according to the same method as Example 1, except for using the poly(amide-imide) copolymer of Synthesis Example 5 instead of the poly(amide-imide) copolymer of Synthesis Example 1.

Example 6

An about 44 μm-thick poly(amide-imide) copolymer film is obtained according to the same method as Example 1, except for using the poly(amide-imide) copolymer of Synthesis Example 7 instead of the poly(amide-imide) copolymer of Synthesis Example 1.

Example 7

An about 47 μm-thick poly(amide-imide) copolymer film is obtained according to the same method as Example 1, except for using the poly(amide-imide) copolymer of Synthesis Example 8 instead of the poly(amide-imide) copolymer of Synthesis Example 1.

Example 8

An about 52 μm-thick poly(amide-imide) copolymer film is obtained according to the same method as Example 1, except for using the poly(amide-imide) copolymer of Synthesis Example 9 instead of the poly(amide-imide) copolymer of Synthesis Example 1.

Comparative Example 1

An about 51 μm-thick poly(amide-imide) copolymer film is obtained according to the same method as Example 1, except for using the poly(amide-imide) copolymer of Comparative Synthesis Example 1 instead of the poly(amide-imide) copolymer of Synthesis Example 1.

Evaluation

Optical characteristics and mechanical characteristics of the poly(amide-imide) copolymer films according to Examples 1 to 8 and Comparative Example 1 are evaluated.

Film thicknesses of the poly(amide-imide) copolymer films are measured by using Micrometer (Mitutoyo Corp.).

Light transmittance is measured as Y(D65) in a region of 380 nanometers (nm) to 780 nm by using a UV spectrophotometer (cm-3600d, Konica Minolta Sensing Inc.).

A yellow index (YI) is measured according to an ASTM D1925 standard by using a UV spectrophotometer (cm-3600d, Konica Minolta Sensing Inc.).

A haze is measured according to an ASTM D1003 standard by using a UV spectrophotometer (cm-3600d, Konica Minolta Sensing Inc.).

A modulus is evaluated by elongating each 10 millimeter-wide (mm-wide) and 50 mm-long film specimens at room temperature at a speed of 5 millimeters per minute (mm/ min) according to an ASTM D882 standard and then, measuring five times per sample according to an ASTM D882 standard by using Instron 3365 (Instron Corp.) and obtaining an average.

Viscosity is measured by using Rheometer (RA 550, TA Instruments) at 25° C.

The results are shown in Table 1.

TABLE 1

|  | Viscosity (Pa × s) | Light transmittance (%) | Yellow index (YI) | Haze | Modulus (GPa) |
|---|---|---|---|---|---|
| Example 1 | 72.7 | 89.0 | 2.1 | 0.4 | 6.3 |
| Example 2 | 75.9 | 89.0 | 2.2 | 0.5 | 6.3 |
| Example 3 | 80.2 | 89.0 | 2.3 | 0.4 | 6.2 |
| Example 4 | 84.0 | 89.0 | 2.1 | 0.3 | 6.1 |
| Example 5 | 75.5 | 88.5 | 4.2 | 0.2 | 6.5 |
| Example 6 | 55.9 | 89.0 | 2.8 | 0.4 | 6.0 ± 0.09 |
| Example 7 | 72.5 | 89.2 | 2.8 | 0.5 | 6.1 ± 0.12 |
| Example 8 | 57.4 | 89.4 | 2.3 | 0.6 | 6.5 ± 0.12 |
| Comparative Example 1 | 50.0 | 89.0 | 2.3 | 0.4 | 5.7 |

Referring to Table 1, the poly(amide-imide) copolymer films according to Examples 1 to 8 have equivalent or improved optical characteristics and improved mechanical properties compared with the poly(amide-imide) copolymer film according to Comparative Example 1.

Accordingly, the poly(amide-imide) copolymers according to Examples 1 to 8 show improved mechanical properties due to a cross-linking structure introduced thereinto.

While this disclosure has been described in connection with what is presently considered to be practical example embodiments, it is to be understood that the present description is not limited to the disclosed embodiments, but, on the contrary, is intended to cover various modifications and equivalent arrangements included within the spirit and scope of the appended claims.

What is claimed is:

1. A composition for making a poly(amide-imide) copolymer, the composition comprising
   a poly(amide-amic acid) copolymer comprising an amide structural unit and an amic acid structural unit included in a polymer main chain, and
   a diisocyanate,
   wherein the amic acid structural unit comprises a structural unit represented by Chemical Formula 5,
   wherein the amide structural unit comprises a structural unit represented by Chemical Formula 4, and
   wherein the diisocyanate is represented by Chemical Formula 6:

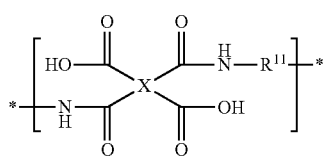

Chemical Formula 5 wherein, in Chemical Formula 5,
X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, or a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond or a linking group comprising a substituted or unsubstituted fluorenyl group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, R$^{11}$ is the same or different in each structural unit and is independently a divalent organic group comprising a substituted or unsubstituted C6 to C30 aromatic or non-aromatic ring, wherein the aromatic or non-aromatic ring is present as a single ring, two or more aromatic rings are condensed to provide a condensed polycyclic aromatic group, or two or more non-aromatic rings are condensed to provide a condensed polycyclic non-aromatic group; or two or more aromatic rings, or two or more aromatic rings and non-aromatic rings, are linked by a single bond or a linking group comprising a substituted or unsubstituted fluorenyl group, O, S, C(=O), OC(=O), S(=O), S(=O)$_2$, C(=O)NH, CR$^f$(OH), SiR$^g$R$^h$, or (CR$^i$R$^j$)$_p$ (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group;

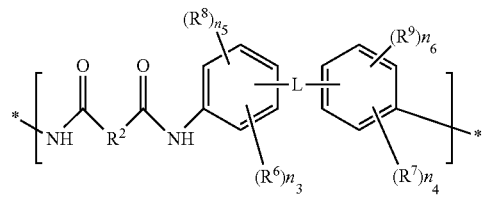

Chemical Formula 4 wherein, in Chemical Formula 4,
L is the same or different in each structural unit and is independently a single bond, —CONH—, -Ph-CONH-Ph-, or —NHCO-Ph-CONH—, wherein "Ph" is a substituted or unsubstituted phenylene group,
R$^2$ is the same or different in each structural unit and is independently a divalent organic group comprising a substituted or unsubstituted C6 to C30 aromatic or non-aromatic ring, wherein the aromatic or non-aromatic ring is present:
as a single ring;
as two or more aromatic or non-aromatic rings that are condensed to provide a condensed polycyclic aromatic or condensed polycyclic non-aromatic group, respectively; or
as two or more aromatic, or non-aromatic rings, that are linked by a single bond or a linking group comprising a substituted or unsubstituted fluorenyl group, O, S, C(=O), OC(=O), S(=O), S(=O)$_2$, C(=O)NH, CR$^k$(OH), SiR$^l$R$^m$, or) (CR$^n$R$^o$)$_p$ (1≤p≤10) to provide a non-condensed polycyclic aromatic or non-condensed polycyclic non-aromatic group, respectively, wherein $R^k$ to $R^o$ are independently hydrogen, a C1 to C30 alkyl group, a C1 to C30 haloalkyl group, a halogen, or a hydroxy group, $R^6$ to $R^9$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n3 and n4 is the same or different in each structural unit and is independently an integer ranging from 0 to 4, n5 and n6 are the same or different in each structural unit and are independently an integer ranging from 0 to 3, n3+n5 is the same or different in each structural unit and is independently an integer ranging from 0 to 4, n4+n6 is the same or different in each structural unit and is independently an integer ranging from 0 to 4, and

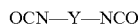 is a linking point of the polymer main chain;

OCN—Y—NCO    Chemical Formula 6 wherein, in Chemical Formula 6,

Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof.

2. The composition of claim 1, wherein the imidization of the amic acid structural unit represented by Chemical Formula 5 in-part provides a structural unit of the poly(amide-imide) copolymer represented by Chemical Formula 3a:

Chemical Formula 3a

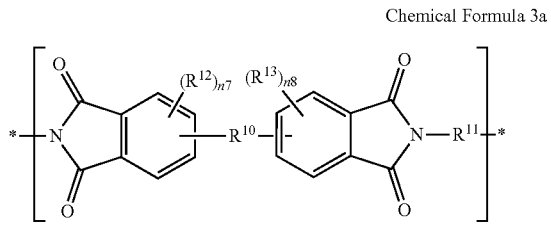

wherein, in Chemical Formula 3a, $R^{10}$ is the same or different in each structural unit and is independently a single bond or a linking group comprising a fluorenylene group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ and R$^{11}$ are as defined, and $R^{12}$ and $R^{13}$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n7 and n8 are the same or different in each structural unit and are independently an integer ranging from 0 to 3, and is a linking point of the polymer main chain.

3. The composition of claim 2, wherein imide structural unit comprises at least one of a structural unit represented by Chemical Formula 3aa or a structural unit represented by Chemical Formula 3ab:

Chemical Formula 3aa

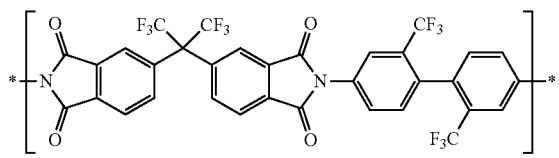

Chemical Formula 3ab

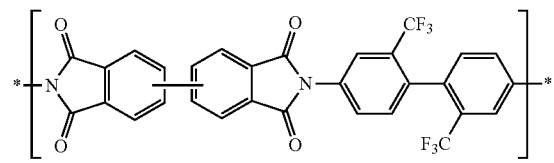

wherein, in Chemical Formulae 3aa and 3ab, * is a linking point of the polymer main chain.

4. The composition of claim 2, wherein the amide acid structural unit represented by Chemical Formula 4 comprises at least one of a structural unit represented by Chemical Formula 4a or a structural unit represented by Chemical Formula 4b:

Chemical Formula 4a

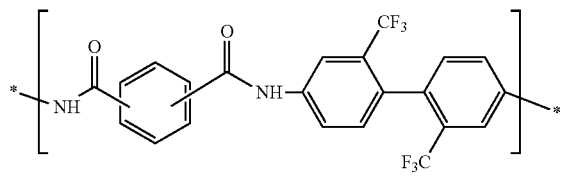

Chemical Formula 4b

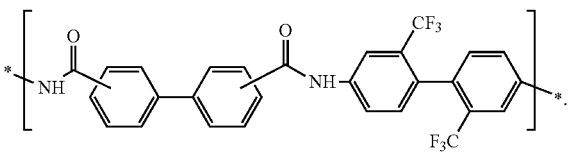

5. A window for a display device comprising a poly(amide-imide) copolymer film prepared from the composition of claim 4.

6. The composition of claim 1, wherein the amide structural unit represented by Chemical Formula 4 comprises at least one of a structural unit represented by Chemical Formula 4a or a structural unit represented by Chemical Formula 4b:

Chemical Formula 4a

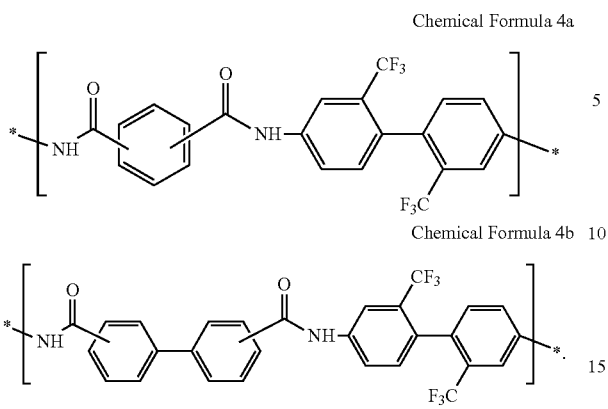

Chemical Formula 4b

7. A poly(amide-imide) copolymer film prepared from composition of claim 1.

8. A window for a display device comprising a poly(amide-imide) copolymer film prepared from the composition of claim 1.

9. A display device comprising the window of claim 8.

10. A method of manufacturing a poly(amide-imide) copolymer, comprising:
preparing a poly(amide-amic acid) copolymer comprising an amide structural unit and an amic acid structural unit included in a polymer main chain,
reacting the poly(amide-amic acid) copolymer with a diisocyanate to prepare a poly(amide-imide) copolymer precursor comprising a moiety cross-linked to an adjacent polymer main chain through an amide bond, and
imidizing the poly(amide-imide) copolymer precursor to obtain the poly(amide-imide) copolymer,
wherein the amic acid structural unit comprises a structural unit represented by Chemical Formula 5,
wherein the amide structural unit comprises a structural unit represented by Chemical Formula 4, and
wherein the diisocyanate is represented by Chemical Formula 6:

Chemical Formula 5

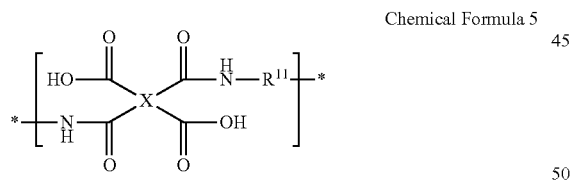

wherein, in Chemical Formula 5,
X is the same or different in each structural unit and is independently a substituted or unsubstituted C6 to C20 monocyclic aromatic group, a substituted or unsubstituted C4 to C20 monocyclic non-aromatic group, a substituted or unsubstituted C8 to C20 condensed polycyclic aromatic group, a substituted or unsubstituted C6 to C20 condensed polycyclic non-aromatic group, a substituted or unsubstituted C6 to C20 non-condensed polycyclic aromatic group, a substituted or unsubstituted C6 to C20 non-condensed polycyclic non-aromatic group, or a combination thereof, wherein each of the substituted or unsubstituted C6 to C20 non-condensed polycyclic aromatic group and the substituted or unsubstituted C6 to C20 non-condensed polycyclic non-aromatic group are linked by a single bond or a linking group comprising a substituted or unsubstituted fluorenyl group, O, S, C(=O), OC(=O), S(=O), S(=O)$_2$, C(=O)NH, CR$^a$(OH), SiR$^b$R$^c$, or (CR$^d$R$^e$)$_p$ (1≤p≤10), wherein R$^a$ to R$^e$ are independently hydrogen, a C1 to C30 alkyl group, a C1 to C30 haloalkyl group, a halogen, or a hydroxy group, R$^{11}$ is the same or different in each structural unit and is independently a divalent organic group comprising a substituted or unsubstituted C6 to C30 aromatic or non-aromatic ring, wherein the aromatic or non-aromatic ring is present as a single ring, two or more aromatic rings are condensed to provide a condensed polycyclic aromatic group, or two or more non-aromatic rings are condensed to provide a condensed polycyclic non-aromatic group; or two or more aromatic rings, or two or more aromatic and non-aromatic rings, are linked by a single bond or a linking group comprising a substituted or unsubstituted fluorenyl group, O, S, C(=O), OC(=O), S(=O), S(=O)$_2$, C(=O)NH, CR$^f$(OH), SiR$^g$R$^h$, or (CR$^i$R$^j$)$_p$, (1≤p≤10) to provide a non-condensed polycyclic aromatic group, wherein R$^f$ to R$^j$ are independently hydrogen, a C1 to C30 alkyl group, a C1 to C30 haloalkyl group, a halogen, or a hydroxy group;

Chemical Formula 4

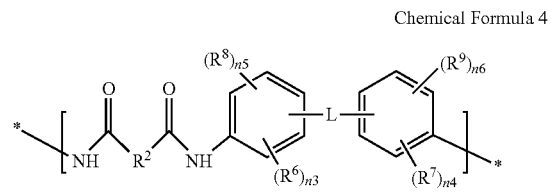

wherein, in Chemical Formula 4,
L is the same or different in each structural unit and is independently a single bond, —CONH—, -Ph-CONH-Ph-, or —NHCO-Ph-CONH—, wherein "Ph" is a substituted or unsubstituted phenylene group,
R$^2$ is the same or different in each structural unit and is independently a divalent organic group comprising a substituted or unsubstituted C6 to C30 aromatic or non-aromatic ring, wherein the aromatic or non-aromatic ring is present:
as a single ring;
as two or more aromatic or non-aromatic rings that are condensed to provide a condensed polycyclic aromatic or condensed polycyclic non-aromatic group, respectively; or
as two or more aromatic, or non-aromatic rings, that are linked by a single bond or a linking group comprising a substituted or unsubstituted fluorenyl group, O, S, C(=O), OC(=O), S(=O), S(=O)$_2$, C(=O)NH, CR$^k$(OH), SiR$^l$R$^m$, or (CR$^n$R$^o$)$_p$, (1≤p≤10) to provide a non-condensed polycyclic aromatic or non-condensed polycyclic non-aromatic group, respectively, wherein R$^k$ to R$^o$ are independently hydrogen, a C1 to C30 alkyl group, a C1 to C30 haloalkyl group, a halogen, or a hydroxy group,
R$^6$ to R$^9$ are the same or different in each structural unit and are independently a substituted or unsubstituted C1 to C30 alkyl group, a substituted or unsubstituted C1 to C30 haloalkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a substituted or unsubstituted silyl group, a halogen, a cyano group, a hydroxy group, a nitro group, or a combination thereof, n3 and n4 is the same or different in each structural unit and is independently an integer ranging from 0 to 4, n5 and n6 are the same or different in each structural unit and are independently an integer ranging from 0 to 3, n3+n5 is the same or different in each structural unit and is independently an integer ranging from 0 to 4, n4+n6 is the same or different in each structural unit and is independently an integer ranging from 0 to 4, and is a linking point of the polymer main chain;

Chemical Formula 6

OCN—Y—NCO wherein, in Chemical Formula 6,

Y is the same or different in each structural unit and is independently a substituted or unsubstituted C1 to C20 alkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C3 to C20 heteroarylene group, or a combination thereof.

* * * * *